Feb. 28, 1961 M. M. REDDI 2,972,897
VARYING TORQUE HEAT MOTOR
Filed March 30, 1956 2 Sheets-Sheet 1
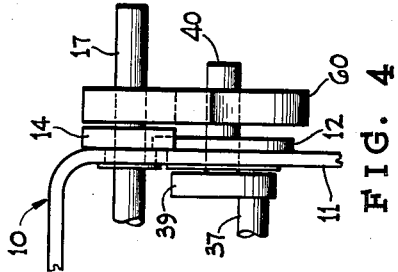
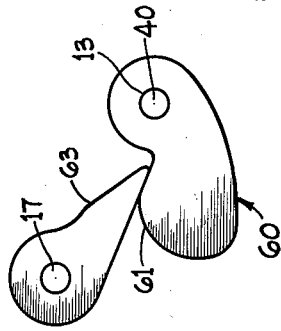
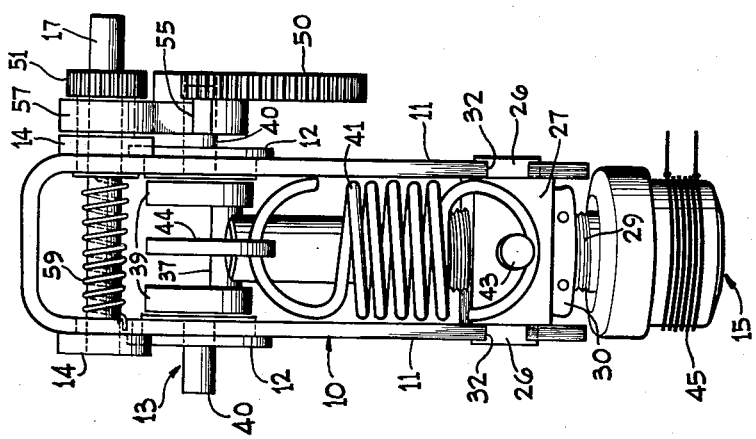
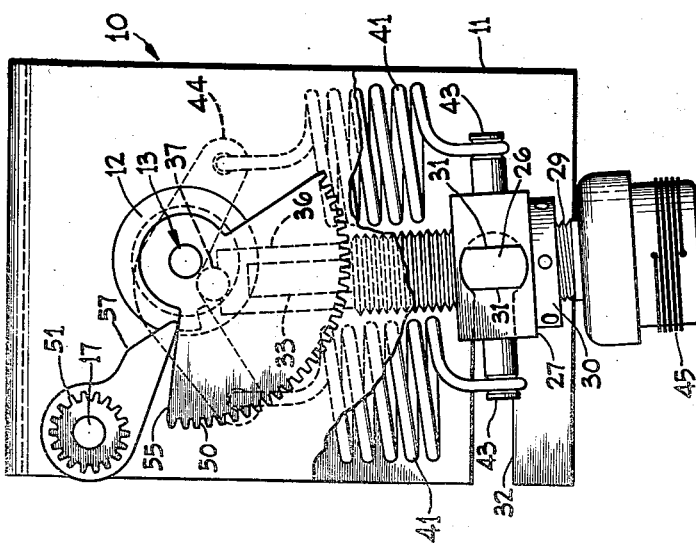
INVENTOR.
MULLAPUDI M. REDDI
ATTORNEYS Feb. 28, 1961 M. M. REDDI 2,972,897
VARYING TORQUE HEAT MOTOR
Filed March 30, 1956 2 Sheets-Sheet 2
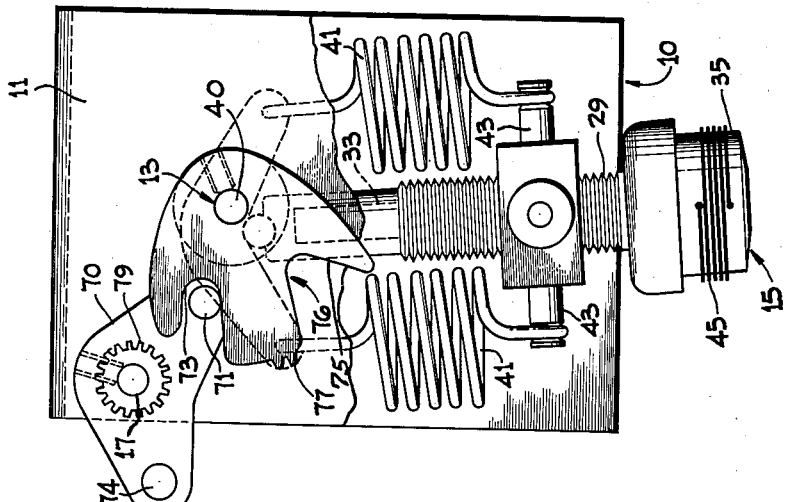
FIG. 5
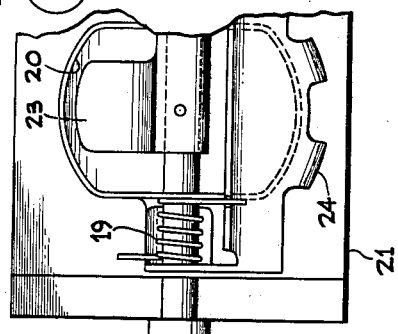
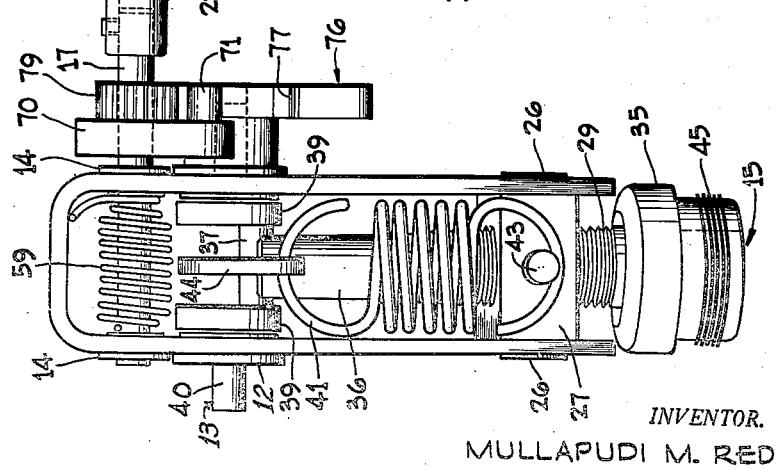
FIG. 6
INVENTOR.
MULLAPUDI M. REDDI
BY *Hill, Sherman, Meroni, Gross & Simpson*
ATTORNEYS

United States Patent Office 2,972,897
Patented Feb. 28, 1961

2,972,897

VARYING TORQUE HEAT MOTOR

Mullapudi M. Reddi, Chicago, Ill., assignor to The Dole Valve Company, Chicago, Ill., a corporation of Illinois Filed Mar. 30, 1956, Ser. No. 575,093

2 Claims. (Cl. 74—99)

This invention relates to improvements in heat motors and more particularly relates to such motors in which a force is generated by the application of heat to a thermal element.

A principal object of the present invention is to provide an improved form of heat motor in which a force is generated by the application of heat, having a high initial torque and relatively low speed in which the torque decreases while the rate of movement of the force transmitting means increases.

Another object of the invention is to provide a novel and efficient form of heat motor in which power is generated by the application of heat to a thermal element having an extensible power member, in which the translational movement of the power member is transferred into rotational movement by a varying length leverage drive connection providing an initial high torque and low rate of speed with a final low torque and relatively high rate of speed.

Still another object of the invention is to provide a heat motor particularly adapated for operating an automatic ice maker and like apparatus so arranged as to provide the relatively high torque required to loosen ice cubes from an ice cube tray and then provide a relatively low torque and high rotational speed to turn the ice cubes from the tray and to eject the cubes therefrom.

Another and important object of the invention is to provide a simple and improved form of heat motor particularly adapted to loosen and eject ice cubes from a tray of an ice cube maker in which a high torque is generated by the application of heat to a power type of thermal element to effect extensible movement of the power member therefor, and in which the high torque is translated into a relatively low torque and high speed drive after breaking the ice cubes loose to remove the same from the tray by an initial varying moment arm leverage connection and a final gear and pinion drive connection.

These and other objects of the invention will appear from time to time as the following specification proceeds and with reference to the accompanying drawings wherein:

Figure 1 is a view in side elevation of a heat motor constructed in accordance with the present invention with a part of the housing therefor broken away;

Figure 2 is an end view of the heat motor shown in Figure 1;

Figure 3 is a fragmentary diagrammatic view illustrating a modified form in which the invention may be embodied;

Figure 4 is a fragmentary end view illustrating the embodiment of the invention shown in Figure 3;

Figure 5 is a view in side elevation somewhat similar to Figure 1, but showing a modified form of drive from the heat motor crank to the output shaft in which the output shaft is positively returned; and Figure 6 is a fragmentary plan view showing the heat motor connected to drive the ejector mechanism of an ice maker.

In the embodiment of the invention illustrated in Figures 1, 2 and 6 of the drawings, the heat motor is shown as being carried in a housing 10 generally U-shaped in end view and having parallel spaced side plates 11. The side plates 11 have aligned bearings 12 recessed therein, forming bearings for a crankshaft 13 operated by a thermal element 15, rockingly carried in said side plates for rocking movement about an axis parallel to the axis of the crankshaft 13, as will hereinafter be more fully described as this specification proceeds.

The side plates 11 also have aligned bearings 14 carried therein and forming bearing supports for an output shaft 17, which may form a driveshaft for driving an ejector shaft 19 for loosening and ejecting ice cubes from cavities 20 in an ice cube tray 21 as illustrated in the form of my invention shown in Figure 6.

Referring again to the embodiment of my invention illustrated in Figures 1 and 2 the ejector shaft 19 is coupled to the output shaft 17 by a suitable coupling generally indicated by reference character 22 in Figure 6. The ejector shaft 19 also has a series of ejector blades 23 secured thereto, one being provided for each cavity 20 in the tray 21 for loosening ice cubes from the cavities 20 and turning the ice cubes from said cavities and ejecting the cubes to one side of the tray 21 as in application of Edward E. Modes and Nicholas Miller, Serial No. 552,526, filed July 18, 1955, Patent No. 2,838,943, and entitled "Rotary Ice Cube Ejector Mechanism" and no part of the present invention so not herein shown or described in detail.

The ejector shaft 19 also has an ejector 24 freely mounted thereon and extending the length of the ice cube tray 21. The ejector 24 is engaged by the ice cubes as the pushers or ejector blades 23 first free and then turn the ice cubes from the cavities 20. The ejector 24 is then moved by the cubes against a torsion spring 25 to store up energy therein during the operation of removing ice cubes from the tray 21. The torsion spring 25 pivots the ejector 24 in an opposite direction from which it is moved by the ice cubes and pusher or ejector blade 23, and ejects the cubes beyond the edge of the tray as in the aforementioned application Serial No. 552,526.

A timer cam and the like (not shown) may also be operated by the crankshaft 13 or the output shaft 17 to time the operation of metering water to the ice cube tray 21 in a manner well known to those skilled in the art, so not herein shown or described.

The thermal element 15 is rockingly mounted in the side plates 11 on trunion pins 26 extending laterally from a spider 27. The spider 27 is internally threaded and has a cylinder 29 of the thermal element 15 threaded therein and forms an adjustable and rocking support for said thermal element in the housing 10. A lock nut 30 is provided to lock the thermal element in its adjusted position on the spider 27. The trunion pins 26 have parallel flattened sides 31 slidably movable along the rectilinear portions of keyhole slots 32 into registry with the arcuate portions of said keyhole slots. The spider 27 and trunion pins 26 may then be turned in the arcuate portions of said slots to lock the spider 27 therein, to form a rocking support therefor.

The thermal element 15 is shown as being a so-called power or high motion solid fill type of thermal element, such as is shown and described in the Vernet Patent No. 2,368,181, dated January 30, 1945. This thermal element has been selected for its compactness and simplicity, as well as its extreme power and relatively long range of travel of a power member or piston 33 thereof, slidably guided in the cylinder 29 for extensible movement with respect thereto upon predetermined increases in temperature. In such types of thermal elements, a thermal medium (not shown) in the form of a fusible material is contained within a casing 35 for the thermal element and reacts against a membrane or deformable member (no shown), to extend the power member or piston 33 with respect to the cylinder 29, as the thermal medium reaches its fusion point. The thermal medium may be a wax alone or a wax containing a powered metal heat conductor and a binder, the material used being selected for its melting or fusion point and the fusion point thereof determining the temperature range of operation of the thermal element.

The power member 33 is shown as extending within a piston extension 36 abutting the top or outer side of the cylinder 29 when the thermal element is cool. The piston extension 36 has bearing engagement at its outer end with an eccentric shaft 37 of the crankshaft 13. The eccentric shaft 37 is shown as being carried in disks 39 at its opposite ends. The disks 39 are mounted on the inner ends of coaxial output shafts 40 of the crankshaft 13, which are journalled in the bearings 12. The crankshaft 13 and power member 33 are moved in a return direction upon cooling of the thermal element 15 by the bias of spaced tension springs 41 extending along each side of the cylinder 29 and power member 33. The tension springs 41 are hooked at their lower ends to diametrically opposed pins 43 extending from the spider 27 at right angles to the trunion pins 26. The springs 41 are hooked at their opposite ends to opposite ends of a yoke 44 shown as being in the form of a modified or flat angled V having slidable bearing engagement with the eccentric shaft 37 of the crankshaft 13 at the under side of the apex thereof.

A resistor heater 45 is shown as encircling the casing 35 of the thermal element 15. The heater 45 may be selectively energized by a suitable switch means (not shown), such as the temperature sensitive switch of an ice cube maker where the heat motor is to be used to eject the ice cubes from an ice cube maker, or by any other desired form of switch means operable to close a circuit to the resistor heater 45 to heat the casing 35 of thermal element 15 and effect extensible movement of the power member 33 with respect to the cylinder 29.

Referring now to the means for driving the output shaft 17 at a relatively high torque for an initial part of the cycle of rotatable movement thereof and at a higher speed and lower torque for the balance of the cycle of rotatable movement thereof, a gear sector 50 is secured to an output shaft 40 of the crankshaft 13 and is rotatably moved thereby upon rotatable movement of said crankshaft. The gear sector 50 is adapted to mesh with a pinion 51 on the output shaft 17 for rotating said output shaft at a higher speed of rotation than the speed of rotation of the gear sector 50 after a predetermined amount of rotatable movement of the output shaft 17. Extending inwardly of the gear sector 50 toward the side wall 11 and forming a continuation of the upper side of said gear sector is a plane cam face 55 extending radially of the axis of rotation of said said gear sector and slidably engaged by a lever arm 57 secured to the output shaft 17 for rotating the same. The lever arm 57 is maintained in slidable engagement with the cam surface 55 by a torsion spring 59 encircling the output shaft 17 and secured to said shaft at one and engaging the end of a wall 11 of the housing 10 at its opposite end, as shown in Figure 2.

In operation of the device when the heater 45 is energized, the application of heat to the thermal element 15 by said heater will effect extensible movement of the power member 33 with respect to the cylinder 29 to rotate the crankshaft 13 a predetermined number of degrees in accordance with the setting of the spider 27 on the cylinder 29. This will effect pivotal movement of the output shaft 17 in a counterclockwise direction by slidable engagement of the lever arm 57 with the cam face 55 and will transmit a relatively high torque to the output shaft 17 until the teeth of the gear sector 50 come into mesh with the teeth of the pinion 51. The gear sector 50 stepping up the speed of rotation of the pinion 51 will thus effect a reduction in torque output of the shaft 17 and an increase in the speed of rotation thereof until the power member 23 reaches the end of its power stroke. When the heater 45 is de-energized and the thermal element 15 cools, the return springs 41 acting on the eccentric shaft 37 of the crankshaft 13 through the yoke 44 will then return the gear sector 50 and power element 33 to effect the return stroke of the output shaft 17, it being understood that after the teeth of the gear sector 50 come out of mesh with the teeth of the pinion 51, the torsion spring 59 will maintain the lever arm 57 in engagement with the camming face 55 and will return the output shaft 17 under the control of said lever arm and cam face.

It will be seen from Figure 1 that the moment arm from the center of the shaft 40 to the point of engagement of the lever arm 57 to the cam 55 is initially relatively short and increases as the shaft 40 rotates in a clockwise direction. The moment arm from the center of the output shaft 17 to the point of engagement of the lever arm 57 to the cam 55 is, however, initially relatively long and decreases as the cam face 55 moves upwardly into engagement with the lever arm 57. This results in an initially high torque available from the output shaft 17 which drops at a gradual rate as a moment arm from the center of the shaft 13 to the point of engagement of the lever arm 57 to the cam face 55 increases and the moment arm from the point of engagement of the lever arm 57 with the cam face 55 to the center of the shaft 17 decreases. As, however, the teeth of the gear sector 50 come into engagement with the teeth of the pinion 51, the speed of rotation of the output shaft 17 will be materially stepped up. At this point, the torque available from the output shaft 17 will rapidly drop off and as the teeth come into mesh, the torque will gradually drop off to the end of the power stroke of the power member 33. During the return stroke of the power member 33 effected by the bias of the tension springs 41, the torque output will be relatively constant until the teeth of the gear sector 50 come out of mesh with the teeth of the opinion 51 and the torsion spring 59 comes into operation to return the output shaft 17 until the power member 33 is fully retracted.

In the modified form of the invention illustrated in Figures 3 and 4, the gear sector 50 and pinion 51 have been dispensed with and a cam 60 having an irregular cam face 61 has been substituted for the gear sector. The cam 60 is secured to the output shaft 40 of the crankshaft 13 for rotation therewith and the cam face 61 thereof is shown as being slidably engaged by a lever arm 63 secured to the output shaft 17 for rotating the same.

Upon rotation of the crankshaft 13 and output shaft 40 thereof and upon extensible movement of the power member 33 from the cylinder 29, the moment arm from the center of the shaft 40 to the point of engagement of the lever arm 63 with the cam face 61 will initially be relatively short. The moment arm from the center of the output shaft 17 to the point of engagement of the lever arm 63 with the cam face 61 will initially be relatively long. The output torque available at the shaft 17 will thus be relatively high as the power member 33 starts on its power stroke due to the mechanical advantage of the moment arms. As the cam 60 continues to rotate and the moment arm from the center of the shaft 40 to the point of engagement of the lever arm 63 with the cam face 61 increases and the moment arm from the point of engagement of the lever arm 63 with the cam face 61 to the center of the output shaft 17 decreases, the output torque will be gradually reduced as the mechanical advantage decreases. This drive arrangement thus provides a relatively high starting torque for breaking the ice cubes loose from the cavities 20 and the ice cube tray which diminishes when a high output torque is no longer required as the ice cubes are turned from the ice cube tray and ejected therefrom.

In the modification of the invention shown in Figures 5 and 6, a lever arm 70 is secured to the output shaft 17 intermediate its ends for rotatably driving said output shaft. The lever arm 70 has a pin 71 projecting outwardly therefrom adjacent one end thereof for engagement with a slot 73 formed in a gear sector 76 secured to the output shaft 40 of the crankshaft 13. The lever arm 70 also has a pin 74 projecting outwardly from the opposite end thereof for engagement with a slot 75 formed in a gear sector 76.

The gear sector 76 is shown as having two teeth 77 engageable with the teeth of a pinion 79 secured to the output shaft 17 for rotating the same at an increased speed upon a predetermined angle of rotation of the gear sector 76.

It should be understood that while the gear sector 76 is shown here as being provided with two teeth only, any number of teeth desired may be provided on said gear sector and that the face of the gear sector may be lengthened or shortened dependent upon the torque output desired and the length of time high speed pivotal movement of the output shaft 17 is required.

As the heater 45 is energized and the power member 33 is extensibly moved with respect to the cylinder 29 by the heat generated by said heater, the pin 71 engageable with the slot 73 will move outwardly along the bottom surface of said slot giving a high available torque output through the output shaft 17, which gradually decreases due to the increasing moment arm from the center of a shaft 40 of the crankshaft 13 to the point of engagement of the pin 71 with the bottom surface of the slot 73. As, however, the teeth 77 come into engagement with the teeth of the pinion 79, there will be a sharp drop in the torque output terminating into a relatively constant torque output as the teeth 77 rotate the pinion 79 and output shaft 17 and bring the pin 74 into engagement with the slot 75. At this time, the pin 74 engaging the bottom surface of the slot 75 will continue rotation of the torque output shaft 17 at a reduced speed and a rapidly increasing torque available from the output shaft 17.

Upon de-energization of the heater 45 and cooling of the thermal element 15, the tension springs 41 will rotate the crank 13 in a return direction and will return the power member 33 within the cylinder 29. The upper surface of the slot 75 will then engage the pin 74 and pivot the lever arm 70 in a clockwise direction until the teeth 77 come into mesh with the teeth of the pinion 79 to continue rotation of the output shaft 17 at an increased speed. Continued retractable movement of the power member 33 effected by the tension springs 41 will then bring the pin 71 into engagement with the slot 73 to positively return the lever 70 independently of the torsion spring 59 with an increasing torque at the end of travel of the lever 70 due to the change in moment arms and increase in mechanical advantage attained by this change in moment arms.

It will be understood from the foregoing that the torque available from the output shaft 17 may readily be varied by varying arrangements of cams and levers and an increase or decrease in the number of teeth on the face of the gear sector and that the various forms of drive arrangements shown are particularly suitable for generating an initially high torque and then continuing at a lower torque with an increase in speed.

It may be further seen that I have provided a simple and efficient heat motor in which power is attained by heating a thermal element having a rectilinearly movable power member and accommodating cooling of the thermal element in a predetermined cycle, and that the heat motor may be so arranged as to provide varying degrees of rotation of the output shaft by varying the position of the cylinder 29 along a spider 27 and to provide a varying torque available from the output shaft as selected in which the initial torque may be relatively high, and to suit the heat motor to provide the high torque necessary to break loose ice cubes from an ice cube tray without melting the faces of the cubes, which torque may then drop with a resultant increase in speed of rotation of the output shaft of the heat motor, to turn and eject the ice cubes from the ice cube tray.

It will be understood that various modifications and variations of the present invention may be effected without departing from the spirit and scope of the novel concepts thereof.

I claim as my invention:

1. In a drive mechanism particularly adapted for ice cube makers and the like, a housing, a power member rockingly carried in said housing and extensible upon the application of energy thereto, a crank shaft journalled in said housing, an engaging connection between said power member and said crank shaft, spring means maintaining said crank shaft in engagement with said power member and returning said power member upon the cessation of the application of energy thereto, an output shaft journalled in said housing, and a varying moment arm drive connection between said crank shaft and said output shaft comprising a gear sector on said crank shaft and rotatably moved thereby and having at least one generally radially extending wall at one end of the teeth of said gear sector and defining a cam face, a lever arm on said output shaft having slidable engagement with said cam face for rotating said output shaft upon rotatable movement of said gear sector, and a pinion on said output shaft spaced from the teeth of said gear sector when said power member is in a retracted position and meshed with the teeth of said gear sector and driven thereby upon a predetermined extent of extensible movement of said power member and moving said lever arm away from said cam face when meshed with the teeth of said gear sector.

2. A drive mechanism particularly adapted for ice makers and the like for converting linear movement to varying torque rotational movement comprising a housing, a power element rockingly carried in said housing and including a member extensibly movable upon the application of energy to said power element, a crank shaft journalled in said housing, an engaging connection between said member and said crank shaft, spring means maintaining said crank shaft in engagement with said member and retractably moving said member upon the deenergization of said power element, an output power shaft journalled in said housing in spaced relation with respect to said crank shaft, a varying moment arm leverage drive connection between said crank shaft and said output power shaft comprising a cam member secured to said crank shaft for rotation therewith, a lever arm on said output power shaft, spring means maintaining said lever arm in engagement with said cam lever, a pinion on said output power shaft, gear teeth extending from said cam member and meshing with said pinion upon a predetermined amount of extensible movement of said power member and rotating said output power shaft at an increased speed of rotation with a reduced output torque available from said output power shaft.

References Cited in the file of this patent

UNITED STATES PATENTS

| 64,940 | Bird | May 21, 1867 |
|---|---|---|
| 885,878 | Skirrow | Apr. 28, 1908 |
| 1,397,987 | Sheppy | Nov. 22, 1921 |
| 2,368,181 | Vernet | Jan. 30, 1945 |
| 2,512,212 | Molotzak | June 20, 1950 |
| 2,594,466 | Luther | Apr. 29, 1952 |
| 2,746,312 | Wood | May 22, 1956 |
| 2,838,943 | Modes | June 17, 1958 |

FOREIGN PATENTS

| 23,426 | Great Britain | Oct. 23, 1907 |
|---|---|---|
| 325,792 | Great Britain | Nov. 15, 1928 |